United States Patent
St. Clair

(12) 
(10) Patent No.: US 6,653,408 B1
(45) Date of Patent: Nov. 25, 2003

(54) COMPOSITIONS COMPRISING A FUNCTIONALIZED BLOCK COPOLYMER CROSSLINKED WITH ALUMINUM ACETYLACETONATE

(75) Inventor: David J. St. Clair, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 26 days.

(21) Appl. No.: 10/301,366

(22) Filed: Nov. 21, 2002

(51) Int. Cl.$^7$ .................................................. C08F 8/42
(52) U.S. Cl. ............................... 525/327.8; 525/332.8; 525/332.9; 525/333.8; 525/333.2; 525/370
(58) Field of Search ........................... 525/327.8, 332.8, 525/332.9, 333.1, 333.2

(56) References Cited

U.S. PATENT DOCUMENTS

| | | | | |
|---|---|---|---|---|
| 3,686,365 A | * | 8/1972 | Sequeira ...................... | 525/89 |
| 5,412,022 A | | 5/1995 | Andres et al. ............... | 524/535 |
| 5,614,595 A | * | 3/1997 | Bender et al. ........... | 525/332.8 |

FOREIGN PATENT DOCUMENTS

| | | |
|---|---|---|
| EP | 0 173 380 A1 | 3/1986 |
| EP | 0 561 843 B1 | 12/1991 |
| GB | 1020720 | 2/1966 |
| JP | 02 251589 A | 10/1990 |
| JP | 03 229784 A | 10/1991 |
| JP | 07 186520 A | 7/1995 |
| WO | 96/40087 | 12/1996 |

* cited by examiner

*Primary Examiner*—Bernard Lipman

(57) ABSTRACT

In one embodiment, this invention provides a composition comprising a functionalized block copolymer crosslinked with acetylacetonate. The crosslinked block copolymer has improved solvent resistance and improved cohesive strength at high temperatures. The crosslinked block copolymer comprises preferably an acid functionalized, hydrogenated block copolymer having an ABA or similar structure wherein the block comprises at least 80 wt % of a vinylaromatic hydrocarbon, preferably styrene, and wherein the B block comprises at least 80 wt % of a hydrogenated and conjugated diene, preferably butadiene, isoprene or a mixture thereof. In another embodiment, this invention provides an adhesive, sealant, oil gel, asphalt composition, or wax composition comprising the acid functionalized, hydrogenated block copolymer.

12 Claims, No Drawings

COMPOSITIONS COMPRISING A FUNCTIONALIZED BLOCK COPOLYMER CROSSLINKED WITH ALUMINUM ACETYLACETONATE

BACKGROUND OF THE INVENTION

1. Field of the Invention

The present invention relates to compositions comprising a functionalized block copolymer crosslinked aluminum acetylacetonate. More particularly, the present invention relates to novel compositions comprising a maleated, hydrogenated tri-block copolymer crosslinked with aluminum acetylacetonate.

2. Background of the Related Art

Compositions based on block copolymers having poly-vinyl-aromatic blocks such as polystyrene, and polydiene blocks such as polybutadiene or polyisoprene, or hydrogenated polydiene blocks such as polyethylene/butylene have a broad utility in commercial applications. Extensive work has been done to crosslink these copolymer blocks to increase upper service temperature and solvent resistance Much of this work has been done to develop pressure sensitive adhesives (PSA) which may be applied as hot melts and subsequently crosslinked by exposure to ultraviolet light or electron beam radiation via a free radical reaction in the unsaturated polydiene blocks. Free radical chemistry has proven to be acceptable for crosslinking ethylenically unsaturated multi-block copolymers containing polydiene blocks, however, free radical chemistry is not desirable for crosslinking saturated block copolymers containing hydrogenated polydiene blocks.

Compositions based on block copolymers having poly-vinyl-aromatic blocks and hydrogenated polydiene blocks are physically crosslinked through the well known domain structure formed by association of the poly-vinyl-aromatic blocks. As a result, compositions based on these physically crosslinked block copolymers may be advantageously processed as solvent-free thermoplastic compositions or as high solids solutions.

One disadvantage associated with compositions based on physically crosslinked multi-block copolymers is that the uses of these compositions are severely limited. Uses of the compositions may include adhesives, sealants, modified asphalt, and oil gels, for example. The domain structure formed by association of the poly-vinyl-aromatic blocks looses integrity when the composition is heated above the glass transition temperature of the poly-vinyl-aromatic blocks. As a result, the upper service temperature of compositions based on these physically crosslinked multi-block copolymers are limited to less than about 100° C. Furthermore, the domain structure formed by association of the poly-vinyl-aromatic blocks looses integrity when the poly-vinyl-aromatic blocks are plasticized with solvent or a compatible plasticizer. As a result, compositions based on physically crosslinked multi-block copolymers weaken in the presence of solvents. Also, an adhesive composition based on these block copolymers is not suitable for use with plasticized polyvinylchloride (PVC) substrates because plasticizers, such as dioctylphthalate (DOP), which are typically used to soften PVC migrate into the adhesive and weaken the adhesive severely.

Therefore, there has been a long felt but unresolved need for a PSA based on crosslinked block copolymers which provides an increase in upper service temperature and improved solvent resistance. There is also a need for a PSA which may be used with PVC plasticized with DOP as a film backing for tapes, labels, and decals. There is further a need for sealants which do not slump out of a joint at higher temperatures. There is still further a need for oil gels which can maintain their shape at higher temperatures. There is yet further a need for modified asphalts which have higher softening points.

BRIEF SUMMARY OF THE INVENTION

In one embodiment, this invention provides a composition comprising a functionalized block copolymer crosslinked with acetylacetonate. The crosslinked block copolymer has improved solvent resistance and improved cohesive strength at high temperatures. The crosslinked block copolymer comprises preferably an acid functionalized, hydrogenated block copolymer having an ABA or similar structure wherein the A block comprises at least 80 wt % of a vinyl-aromatic hydrocarbon, preferably styrene, and wherein the B block comprises at least 80 wt % of a hydrogenated conjugated diene, preferably butadiene, isoprene, or a mixture thereof.

In another embodiment, this invention provides an adhesive, sealant, oil gel, asphalt composition, or wax composition comprising the acid functionalized, hydrogenated block copolymer.

DETAILED DESCRIPTION OF THE INVENTION

The present invention generally provides functionalized, hydrogenated-block copolymers crosslinked with aluminum acetylacetonate (AlAcAc). The copolymers are typically prepared by grafting maleic anhydride (MA) onto the block copolymer in an extruder grafting process. The acid groups grafted onto the copolymer form a reactive site which is then useful in a crosslinking reaction with the AlAcAc. Pressure sensitive adhesives comprising the block copolymers crosslinked with AlAcAc surprisingly exhibit an increased upper service temperature and improved solvent resistance. The adhesives can also prevent shrinkage of a DOP plasticized PVC film decal upon aging. Oil gels, modified asphalt, and modified waxes comprising the block copolymers crosslinked with AlAcAc surprisingly exhibit a very high softening point. Sealants comprising the block copolymers crosslinked with AlAcAc surprisingly exhibit good slump resistance at high temperatures.

The block copolymers, prior to hydrogenation, have both ethylenic and/or aromatic unsaturation, and may be prepared by copolymerizing one or more olefins, particularly a diolefin, with one or more alkenyl aromatic hydrocarbon monomers. The copolymers may be prepared using anionic initiators or polymerization catalysts using bulk, solution, or emulsion techniques.

In general, when solution anionic techniques are used, conjugated diolefin polymers and copolymers of conjugated diolefins and alkenyl aromatic hydrocarbons are prepared by contacting the monomer or monomers to be polymerized simultaneously or sequentially with an anionic polymerization initiator such as a Group IA metal or its alkyl, amide, silanolate, napthalide, biphenyl or anthracenyl derivative. It is preferred to use an organoalkali metal such as a sodium or potassium compound, for example, in a suitable solvent at a temperature within the range from about −100° C. to about 200° C., preferably at a temperature within the range from about 0° C. to about 100° C.

Particularly effective anionic polymerization initiators are organolithium compounds having the general formula:

$$RLi_n,$$

wherein R is an aliphatic, cycloaliphatic, aromatic or alkyl-substituted aromatic hydrocarbon radical having from 1 to about 20 carbon atoms; and n is an integer of 1 to 4.

Conjugated diolefins useful in preparing the block copolymers include conjugated diolefins containing from 4 to about 8 carbon atoms such as 1,3-butadiene, 2-methyl-1,3-butadiene (isoprene), 2,3-dimethyl-1,3-butadiene, 1,3-pentadiene, 1,3-hexadiene and the like. Mixtures of such conjugated dienes may also be used. The preferred conjugated diene is 1,3-butadiene.

Alkenyl aromatic hydrocarbons useful in preparing the block copolymers include vinyl aryl compounds such as styrene, various alkyl-substituted styrenes such as p-methylstyrene, p-tert-butylstyrene, and alpha-methylstyrene, alkoxy-substituted styrenes, vinyl naphthalene, alkyl-substituted vinyl naphthalenes, and the like. The preferred vinyl aromatic hydrocarbon is styrene.

Any of the inert hydrocarbon solvents known in the prior art to be useful in the preparation of such polymers may be used. In particular, suitable solvents may include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene, and the like; hydrogenated aromatic hydrocarbons such as tetralin decalin, and the like.

The polymers of this invention may be hydrogenated as disclosed in U.S. Pat. No. Reissue 27,145, which is herein incorporated by reference. The hydrogenation of these polymers and copolymers may be carried out by a variety of well established processes including hydrogenation in the presence of such catalysts as Raney Nickel, noble metals such as platinum and the like, soluble transition metal catalysts as in U.S. Pat. Nos. 3,113,986 and 4,226,952, which are incorporated herein by reference, and titanium catalysts as in U.S. Pat. No. 5,039,755, which is also incorporated herein by reference. Hydrogenation should reduce at least about 50 percent, preferably at least 70 percent, more preferably at least 90 percent, and most preferably at least 99 percent of the olefinic unsaturation originally present in the polydiene block. Hydrogenation can be selective in which case the olefinic unsaturation is reduced from the polydiene block while the aromatic unsaturation in the poly-vinyl-aromatic block remains essentially unhydrogenated. If desired, hydrogenation can be complete in which case both the olefinic unsaturation and the aromatic unsaturation are reduced.

Block copolymers of conjugated dienes and vinyl aromatic hydrocarbons include any of those which exhibit elastomeric properties at the temperatures of use. Therefore, the polydiene block should be largely amorphous and not contain excessive crystallinity which would interfere with flexibility. Butadiene, for example, the percent of 1,2-addition should preferably be greater than about 30 percent to avoid crystallinity after hydrogenation. Below about 30 percent 1,2-addition, crystallinity is too high, producing a polymer which is too stiff for use in adhesives which must perform at temperatures as low as about 0° C.

Suitable block copolymers as a precursor to the functionalized, hydrogenated block copolymers may have varying structures containing various ratios of conjugated dienes to vinyl aromatic hydrocarbons including those containing up to about 60 percent by weight of vinyl aromatic hydrocarbon. Thus, multiblock copolymers may be utilized which are linear or radial, symmetric or asymmetric, and which have structures represented by the formulae, A-B, A-B-A, A-B-A-B, B-A-B, $(AB)_{0,1,2,\ldots}$-BA and the like wherein A is a polymer block of a vinyl aromatic hydrocarbon or a conjugated diene/vinyl aromatic hydrocarbon tapered copolymer block comprising at least 80 wt % of the vinyl/aromatic hydrocarbon and B is a polymer block of a conjugated or a conjugated diene/vinyl/aromatic tapered copolymer block comprising at least 80 wt % of the conjugated diene. Suitably, the A block or blocks compose 5 to 60, preferably 5 to 30, percent by weight of the copolymer. Such blocks suitably have a number average molecular weight of 2,000 to 115,000 to preferably of 4,000 to 60,000. Suitably, the B block or blocks have a number average molecular weight of 20,000 to 450,000. Preferably, the block copolymer is a tri-block having the A-B-A structure, more preferably an ABA block copolymer having polystyrene end blocks.

The block copolymers may be produced by any well known block polymerization or copolymerization procedures including the well known sequential addition of monomer techniques, incremental addition of monomer technique or coupling technique as illustrated in, for example, U.S. Pat. Nos. 3,251,905; 3,390,207; 3,598,887 and 4,219,627, which are incorporated herein by reference.

The acid functionalized block copolymer may be prepared by graft-reacting an acid moiety or its derivative onto the hydrogenated block copolymer via a free radically initiated reaction. Suitable monomers which may be grafted include unsaturated mono- and polycarboxylic acids and anhydrides containing from about 3 to about 10 carbons. Examples of such monomers are fumaric acid, itaconic acid, citraconic acid, acrylic acid, maleic anhdride, itaconic anhydride, and citraconic anhydride. The preferred grafting monomer is maleic anhydride. The grafted polymer will usually contain from 0.1 to 10, preferably 0.2 to 5 percent by weight of grafted monomer.

The grafting reaction can be carried out in solution or by melt-mixing the base block copolymer and the acid/anhydride monomer in the presence of a free radical initiator. Disclosures for such processes are found in U.S. Pat. Nos. 4,033,888; 4,077,893; and 4,670,173 for solution processes and in U.S. Pat. Nos. 4,427,828; 4,578,429; 4,628,072; and 4,657,971 for melt-mixing processes, all of which are incorporated herein by reference.

The above-described polymers may be readily prepared by the methods set forth above. However, suitable polymers are commercially available from any of the KRATON Polymer companies. Preferred block copolymers which are commercially available are KRATON® G1652, KRATON® G1657, KRATON® G1726, KRATON® FG1901 and KRATON® FG1924.

It is believed that the crosslinked compositions described herein have utility in a broad range of applications where the thermoset properties of these compositions are required. Examples include applications in adhesives, including pressure sensitive adhesives for tapes and labels, contact adhesives, laminating adhesives, and assembly adhesives, which have improved load bearing capacity at elevated temperatures, in sealants which have better slump resistance at elevated temperatures, in oil gels which maintain their integrity at higher temperatures, in blends with asphalt for roofing products and waterproofing membranes which can be used at higher temperatures without sagging on sloped surfaces, and in blends with wax for use in non-drip candles or in coatings which stay in place on sloped surfaces.

Compositions based on acid functionalized block copolymers crosslinked with AlAcAc may be mixed and applied as a solvent solution The multi-block copolymers may be dissolved in a solvent blend containing a major amount of a hydrocarbon solvent, such as toluene, and a minor amount of a polar solvent, such as a ketone, an ester, or an alcohol. The amount of polar solvent depends on the particular polar solvent chosen and the structure of the particular polymer used in the formulation. However, the amount of polar solvent used in the blend is usually between about 10 and about 50 percent by weight of the solvent blend.

Aluminum Acetylacetonate (AlAcAc) is a solid having a melting point of 194° C., and is preferably dissolved in a hydrocarbon solvent such as toluene, for example. However, AlAcAc is preferably dissolved in a blend of solvents such as a blend of toluene and isopropyl acetate (iPAc). Preferably, from about 10% by weight to about 25% by weight of solid AlAcAc, more preferably at least 10% by weight, is dissolved in the blend of toluene and iPAc. The blend of toluene and iPAc preferably has at least a 50:50 weight percent ratio of toluene and iPAc, and more preferably a 75:25 weight percent ratio of toluene and iPAc.

The copolymer solution and AlAcAc solution are then mixed in correct proportions immediately before applying the composition. Aluminum acetylacetonate is present in a concentration from about 0.2 percent by weight to about 10 percent by weight of the block copolymer. The two components are preferably mixed just before application because the curing reaction between the acid functionalized block copolymer and AlAcAc takes place at room temperature. Alternatively, 2,4-pentanedione may be included as part of the solvent system to inhibit the curing reaction.

After the solution have been mixed and applied, the solvents are allowed to evaporate and the crosslinking reaction allowed to proceed. The crosslinking reaction begins when the solutions are mixed, but complete cure can take several hours to several weeks depending on cure conditions.

Alternatively, compositions based on acid functionalized block copolymers crosslinked with AlAcAc may be mixed and applied as a solvent free hot melt. Typically, all the components except AlAcAc are mixed using an appropriate mixer and then the AlAcAc is added just prior to application. Mixing temperatures should be high enough to prevent gellation during mixing, and after addition of the AlAcAc, the hot melt should not cool before application, otherwise the hot melt will gel. Typically, the hot melt is mixed in a high shear mixer for about 1 to 3 hours at from about 100 to about 200° C. After a homogeneous blend is obtained, the AlAcAc is added and mixing is continued for at least about 10 minutes before the hot melt is applied.

Ingredients in addition to the polymer, crosslinker, and solvent may be used to prepare compositions having a proper combination of properties, such as adhesion, cohesion, durability, low cost, etc., for a particular application. Thus, suitable formulations may contain combinations of additives, resins, plasticizers, fillers, and stabilizers, for example.

Resins and plasticizers may be used in many adhesive, sealant, and coating formulations to impart adhesion and to develop the proper mechanical and viscoelastic properties. A particular resin or plasticizer may be more compatible thermodynamically with the A block or with the B block of the polymer. Resins compatible with the A block are referred to as endblock resins. Generally, endblock resins make the compositions stiffer. Resins compatible with the B block are referred to as midblock resins. Generally, midblock resins make the compositions tacky and therefore, are called tackifying resins. Plasticizers compatible with the B block are used to soften the composition. Plasticizers compatible with the A block are generally not used since they reduce the glass transition temperature (Tg) of the A block.

Resins are low molecular weight hydrocarbon polymers, generally having molecular weights between about 500 and 5,000. Although resins may be liquids, most are brittle solids, characterized by a ring and ball softening point as determined by ASTM method E28. Most commonly used resins have softening points between about 80 and 140° C. Midblock resins are usually aliphatic, cycloaliphatic, or aromatic modified aliphatic polymers.

Midblock resins can be used in formulations up to about 70 percent by weight of the composition. Examples of typical midblock resins from Hercules, Inc, include PICCOTAC, HERCOTAC, REGALREZ, REGALITE, PICCOLYTE, and FORAL. PICCOTAC resins are aliphatic. HERCOTAC resins are aromatic modified aliphatic resins. REGALREZ and REGALITE resins are hydrogenated aromatics. PICCOLYTE resins are polyterpenes and FORAL resins are rosin esters.

Endblock resins are highly aromatic polymers, and may be used in formulations up to about 40 percent by weight of the composition. Examples of typical endblock resins from Hercules, Inc, include PICCO, ENDEX, KRISTALEX and PICCOTEX PICCO resins are made by polymerizing an aromatic stream. ENDEX, KRISTALEX and PICCOTEX are made from pure monomers such as styrene, alpha-methylstyrene, and vinyl toluene.

Midblock plasticizers can be liquid resins or synthetic oils like polybutenes, but the most common midblock plasticizers are rubber compounding oils. These low aromatic content oils are well known in the art and include both high saturates content oils and naphthenic oils. Preferred oils are naphthenic process oils like the SHELLFLEX oils from Shell and the highly saturated white mineral oils like the TUFFLO oils from Arco and the DRAKEOL oils from Penreco. In adhesives and sealants, oil may be used up to about 30 percent by weight. In oil gels, oil may be as much as about 95 percent by weight of the composition.

Asphalts useful in the present invention are selected on the basis of their compatibility with the polymer in order to prevent the polymer from phase separating from the mixture. Generally, preferred asphalts are straight run, unblown asphalts, especially those derived from naphthenic crudes. For soft products, an asphalt having a penetration of about 150 may be used. For harder products, asphalts having a penetration as low as about 10 may be used. Blown asphalts may be used but greater attention must be paid to compatibility between the polymer and the asphalt. Low levels of asphalt may be used as a formulating ingredient in adhesives and sealants. For products like waterproofing membranes and road crack sealants, asphalt may comprise up to 95 percent by weight of the composition.

Useful waxes may include petroleum waxes, both paraffin and microcrystalline, such as the SHELLWAX and SHELLMAX waxes from Shell, synthetic waxes, low molecular weight polyethylene and polypropylene, and naturally occurring waxes. As a component of a hot melt packaging adhesive, wax may comprise up to about 50 percent by weight of the composition. As a barrier coating, wax may comprise up to about 95 percent by weight of the composition.

Various types of fillers and pigments may also be included in the formulations. This is especially true for exterior sealants in which fillers are added not only to create the desired visual appeal, but also to improve the weatherability of the sealant Suitable fillers include calcium carbonate, clays, talc, silica, zinc oxide, titanium dioxide and the like. The amount of filler added may range up to about 65 percent by weight of the composition, depending on the type of filler and the application for which the composition is intended.

Stabilizers may be added to protect the compositions against degradation due to heat, oxygen, ozone or ultraviolet (UV) light. Primary antioxidants include sterically hindered phenolics such as butylated hydroxy toluene. Secondary antioxidants such as phosphites, like tris-nonylphenyl phosphite, or thioethers may also be used. Various other stabilizers such as UV absorbers and hindered amine light stabilizers may be added to protect against UV degradation. The amount of stabilizer added is usually less than about 1 percent by weight However, for applications requiring very long durability, stabilizers may be added up to about 6 percent by weight.

The present invention will be further illustrated by the following non-limiting examples which are summarized in Tables 1–19 as discussed below. The maleated block copolymers are described in Tables 1 and measured solution viscosity is reported in Table 2. The known composition of other commercial products identified in the Examples is shown in Table 19.

TABLE 1

Characterization of Maleic Anhydride Grafted Polymers Base Polymer for Grafting

| Polymer | KRATON | % w S | Coupling Eff. % | Status | Bound MA. % w | Color |
|---|---|---|---|---|---|---|
| KRATON FG1924 | G1657 | 13 | 65 | commercial | 1.0 | very pale yell. |
| GRP 6627 | G1657 | 13 | 65 | sample | 2.0 | yellow |
| KRATON FG1901 | G1652 | 30 | 100 | commercial | 1.5 | pale yellow |
| Run B22 | G1726 | 30 | 30 | sample | 2.0 | yellow |

TABLE 2

Solution Viscosity of MA Functionalized KRATON G Polymers

| Solvent Composition, % w | | | | |
|---|---|---|---|---|
| Toluene | 100 | 75 | 100 | 75 |
| Isopropyl acetate | | 25 | | 25 |
| Polymer Concentration, % w | 15 | 15 | 25 | 25 |
| Polymer | Brookfield Viscosity @ 25° C., centipoise | | | |
| KRATON G1657 | 450 | 395 | | |
| KRATON FG1924 | 1670 | 335 | | |
| GRP 6627 | 4310 | 350 | | |
| KRATON G1652 | 120 | 165 | | |
| KRATON FG1901 | 445 | 125 | | |
| KRATON G1726 | | | 205 | 230 |
| Run B22 | | | 715 | 320 |

EXAMPLE 1

Four pressure sensitive adhesive samples were prepared to determine the effect of crosslinking various KRATON® G Polymers with AlAcAc as listed in Table 3. In each sample, a solution of the adhesive (according to the concentrations shown in Table 3) with everything except AlAcAc was prepared at 40% by weight in a 75/25 blend of toluene and iPAc. A 10% by weight solution of AlAcAc was prepared in a 75/25 blend of toluene and iPAc. Immediately before casting films, the AlAcAc solution was mixed into the adhesive solution. Films were then cast. The solvent was flashed in the hood for 1 hour and the samples usually were baked for 10 minutes at 180° C. The films were stored for at least 16 hours at 25° C. before being tested. The PSA film thickness was typically 35 to 50 microns.

The two most important tests to show whether the polymer has crosslinked are the SAFT to Mylar and the Gel soaked in Toluene. In the Shear Adhesion Failure Test (SAFT), a 25 by 25 millimeter lap shear bond is made of the PSA on Mylar to another piece of Mylar. One piece of the lap shear specimen is fixed in an oven and a 500 gram weight is attached to the other piece. The temperature of the oven is raised at a rate of 22° C. per hour. The SAFT is the temperature at which the adhesive can no longer bear the load and so the weight falls. Crosslinking the polymer in the PSA generally causes an increase in SAFT. In the Gel soaked in Toluene test, a piece of PSA about 25 by 25 mm is merely soaked in toluene. If the adhesive dissolves, it is not crosslinked. If it swells but does not dissolve, it is crosslinked.

As shown in Table 3, the PSA containing the non-acid functional polymers, KRATON® G1652 and KRATON® G1657, failed at 90° C. and at 66° C., respectively, in the SAFT test and merely dissolved when soaked in toluene, indicating that the non-acid functional polymers were not crosslinked. In contrast, both adhesives based on the acid-functionalized polymers gave SAFT values higher than those of their unfunctionalized precursors and well above the Tg of the polystyrene end blocks on the polymers and both swelled but did not dissolve when soaked in toluene. This indicates that both polymers were crosslinked by the AlAcAc.

Table 3 also illustrates the PSA solution time to gel. After the AlAcAc was added to the adhesive solution, the bottles were left on the bench top and their viscosities were checked periodically by tipping the bottles. It was surprisingly found that the adhesive containing GRP 6627 gelled about 2 hours after the AlAcAc was added and that the adhesive containing KRATON® FG1901 gelled about 2 days after the AlAcAc was added. This indicates that the crosslinking reaction proceeds even at room temperature, suggesting that it may not be necessary to bake the films after casting the adhesive solutions.

TABLE 3

Crosslinking of maleated KRATON G with AlAcAc

| Composition, % w | 1 | 2 | 3 | 4 |
|---|---|---|---|---|
| KRATON G1652 | 30.0 | | | |
| KRATON FG1901 | | 30.0 | | |
| KRATON G1657 | | | 30.0 | |
| GRP 6627 | | | | 30.0 |
| REGALREZ 1085 | 52.2 | 52.2 | 54.5 | 54.5 |
| DRAKEOL 34 | 17.8 | 17.8 | 15.5 | 15.5 |
| Aluminum acetylacetonate | 0.45 | 0.45 | | 0.45 |
| PSA Solution, Time to Gel, hr | — | 48 | — | 2 |
| Properties[a] | | | | |
| Rolling Ball Tack, cm | 3 | 4 | 1 | 4 |
| Polyken Probe Tack, kg | 1.3 | 1.2 | 1.6 | 1.0 |
| Loop Tack, oz/in | 90 | 40 | 186 | 80 |
| 180° Peel, pli | 1.3 | 1.1 | 4.4 | 1.5 |
| HP to Steel (.5 × .5", 2 kg), min | 15 | 20 | 20 | 40 |
| SAFT (1 × 1", .5 kg), ° C. | 90 | 135 | 66 | 120 |
| Gel soaked in toluene | none | Nice[b] | none | nice[b] |

[a]Adhesives cast on Mylar, baked 10 minutes at 180° C.
[b]Gel swollen in toluene remained on mylar, nice, smooth, spongy gel.

EXAMPLE 2

Four PSA samples were prepared according to the method of EXAMPLE 1 to determine the effect of crosslinking KRATON® FG 1924 polymer with AlAcAc. Table 4 shows the effect of the concentration of AlAcAc in a formulation based on KRATON® FG1924. Results show that 0.2%w AlAcAc gives enough crosslinking to increase the SAFT by 13° C. and render the adhesive insoluble in toluene. Results also show that SAFT continues to increase with increasing concentration of AlAcAc, with almost a 30° C. increase for the PSA containing 1.0%w AlAcAc.

EXAMPLE 3

Seven samples were prepared according to EXAMPLE 1 to determine the effect of cure conditions on KRATON® FG1924 polymer crosslinked with AlAcAc. Table 5 shows the properties of two sets of adhesives, one set containing 0.2%w AlAcAc and the other containing 1.0%w AlAcAc, cured at 25° C., 80° C., and 180° C.

Results of soaking the adhesive in toluene show that both sets of adhesives crosslinked at all three temperatures. However, it was judged qualitatively that the gel structure formed when the samples were baked at 180° C. had better integrity than when baked at 80° C. or just allowed to cure at 25° C. Both samples cured at 25° C. showed about a 30° C. increase in SAFT to Mylar over the uncrosslinked control. Surprisingly, the samples cured at 80° C. or 180° C. showed no further increase in SAFT to Mylar or actually decreased compared to the samples cured at 25° C. Results suggest that the temperature at which the adhesive cures is not particularly critical.

EXAMPLE 4

Five samples similar to EXAMPLE 4 were prepared except the samples were prepared using REGALITE R91 instead of REGALREZ 1085. Table 6 shows the results. Results show that the adhesive solution using 1%w AlAcAc gelled within 2 hours after mixing in the AlAcAc. At lower levels of AlAcAc, the gelation times are longer but, even with only 0.1%w AlAcAc, the adhesive solution gelled in about a week. That the solutions gel means that the crosslinking reaction takes place even at room temperature. Therefore, it could be expected that adhesive properties might change with time. To check this, SAFT was measured periodically for up to 3 weeks after the films were cast. Results show that, indeed, SAFT continues to increase. The higher the concentration of AlAcAc, the higher the ultimate SAFT.

TABLE 4

Crosslinking of KRATON FG1924 with AlAcAc

| Composition, % w | 1 | 2 | 3 | 4 |
|---|---|---|---|---|
| KRATON FG1924 | 30.0 | 30.0 | 30.0 | 30.0 |
| REGALREZ 1085 | 54.4 | 54.4 | 54.4 | 54.4 |
| DRAKEOL 34 | 15.5 | 15.5 | 15.5 | 15.5 |
| Aluminum acetylacetonate | | 0.2 | 0.5 | 1.0 |
| Properties[a] | | | | |
| Rolling Ball Tack, cm | 1.6 | 2.7 | 3.0 | 2.3 |
| Polyken Probe Tack, kg | 1.6 | 1.2 | 0.85 | 0.95 |
| Loop Tack, oz/in | 114 | 98 | 92 | 90 |
| 180° Peel, pli | 3.4 | 3.1 | 2.8 | 2.7 |
| HP to Steel (.5 × .5", 2 kg), min | 1800 | 420 | 97 | 32 |
| HP to Steel (1 × 1", 2 kg), min | >4000 | >4000 | >4000 | 2600 |

TABLE 4-continued

Crosslinking of KRATON FG1924 with AlAcAc

| Composition, % w | 1 | 2 | 3 | 4 |
|---|---|---|---|---|
| SAFT (1 × 1", .5 kg), ° C. | 70 | 83[b] | 84[b] | 97[b] |
| Gel soaked in Toluene | None | nice[c] | crumbly[d] | coherent[e] |

[a]Adhesives cast on Mylar, baked 10 minutes @ 180° C. Films were aged for 3 days at CTCH before testing. Films for SAFT and gel were aged 6 days at CTCH.
[b]SAFT's failed by creep, so test measured creep rate, not softening point.
[c]Gel swollen in toluene remained on Mylar, nice, smooth, spongy gel.
[d]Gel swollen in toluene came off Mylar and fell to pieces.
[e]Gel swollen in toluene came off Mylar but maintained its integrity as a swollen, glossy film.

TABLE 5

Crosslinking of KRATON FG1924 with AlAcAc - Effect of Cure Conditions

| | % w | | | | | |
|---|---|---|---|---|---|---|
| | 1 | 2 | 3 | 4 | 6 | |
| Composition | | | | | | |
| KRATON FG1924 | 30.0 | 30.0 | 30.0 | 30.0 | 30.0 | 30.0 | 30.0 |
| REGALREZ 1085 | 54.4 | 54.4 | 54.4 | 54.4 | 54.4 | 54.4 | 54.4 |
| DRAKEOL 34 | 15.5 | 15.5 | 15.5 | 15.5 | 15.5 | 15.5 | 15.5 |
| Aluminum acetylacetonate | | 0.2 | 1.0 | 0.2 | 1.0 | 0.2 | 1.0 |
| Cure Condition | a | a | a | b | b | c | c |
| Properties[d] | | | | | | | |
| Rolling Ball Tack, cm | 1.6 | 2.0 | 2.6 | 1.2 | 2.2 | 1.7 | 2.3 |
| Polyken Probe Tack, kg | 1.5 | 1.1 | 0.9 | 1.7 | 1.2 | 1.8 | 1.7 |
| Loop Tack, oz/in | 95 | 101 | 65 | 111 | 69 | 122 | 104 |
| 180° Peel, pli | 3.7 | 3.1 | 3.0 | 3.6 | 3.0 | 3.6 | 3.0 |
| HP to Steel (.5 × .5", 2 kg), min | 59 | 44 | 31 | 44 | 44 | 86 | 132 |
| SAFT (1 × 1", .5 kg), ° C. | 69 | 97 | 100 | 86 | 94 | 69 | 102 |
| Gel soaked in Toluene | none | slight | Pocks | slight | pocks | nice[e] | nice[e] | a. Cured 16 hours @ 25 ° C.
b. Cured 10 minutes @ 80° C.
c. Cured 10 minutes @ 180° C.
d. Adhesives were cast on Mylar and cured under conditions a, b or c.
[e]. Gel swollen in toluene remained on mylar, nice, smooth, spongy gel.

Tables 6, 7, and 8 compare results of the curing experiments using KRATON® FG1924 polymer (maleated KRATON® 01657 polymer), Run B22 (maleated KRATON® G1726 polymer) and KRATON® FG1901 polymer (maleated KRATON® G1652 polymer). The general pattern of behavior was about the same for all three polymers in that 0.2%w AlAcAc was the minimum necessary to crosslink the adhesives to the point that they would not dissolve completely when soaked in toluene. With FG1924 and B22 polymer, SAFT continued to increase over a three week period while with FG1901, the crosslinking reaction appeared to be finished within one week.

TABLE 6

Crosslinking of KRATON FG1924 with AlAcAc

| Composition, % w | 1 | 2 | 3 | 4 | 5 |
|---|---|---|---|---|---|
| KRATON FG1924 | 30.0 | 30.0 | 30.0 | 30.0 | 30.0 |
| REGALITE R91 | 54.4 | 54.4 | 54.4 | 54.4 | 54.4 |
| DRAKEOL 34 | 15.5 | 15.5 | 15.5 | 15.5 | 15.5 |

TABLE 6-continued

Crosslinking of KRATON FG1924 with AlAcAc

| Composition, % w | 1 | 2 | 3 | 4 | 5 |
|---|---|---|---|---|---|
| Aluminum acetylacetonate | | 0.1 | 0.2 | 0.5 | 1.0 |
| PSA Solution, Time to Gel, hr | — | 192 | 18 | 3.5 | 2 |
| Properties[a] | | | | | |
| Rolling Ball Tack, cm | 4.2 | 2.6 | 2.4 | 2.4 | 3.1 |
| Polyken Probe Tack, kg | 0.87 | 1.3 | 1.1 | 1.0 | 1.1 |
| Loop Tack, oz/in | 75 | 93 | 73 | 62 | 73 |
| 180° Peel, pli | 2.4 | 3.0 | 2.4 | 2.1 | 2.3 |
| HP to Steel (.5 × .5", 1 kg), min | >4000 | >4000 | >4000 | >4000 | >4000 |
| Gel soaked in Toluene | No | no | yes | yes | yes |
| SAFT (1 × 1", .5 kg), °C. | | | | | |
| 0 day | 59 | 49 | 76 | 77 | 77 |
| 1 day | 61 | 62 | 71 | 81 | 88 |
| 5 day | 64 | 71 | 79 | 83 | 94 |
| 1 wk | 67 | 74 | 83 | 87 | 104 |
| 2 wk | 71 | 79 | 86 | 88 | 112 |
| 3 wk | 74 | 82 | 88 | 91 | 119 |

[a]Adhesives cast on Mylar, baked 10 minutes @ 180° C., stored at CTCH.

EXAMPLE 5

The working life of the formulations of EXAMPLES 4 were examined. Gelation is somewhat difficult to define and detect qualitatively because the gels initially are quite soft and have limited integrity. Therefore, Brookfield viscosity was measured on the adhesives in Tables 6, 7, and 8 at various times after AlAcAc had been added to the solutions at 40%w solids in a 75/25 w/w ratio of toluene/isopropyl acetate. Results, presented in Table 9, show that the higher MW polymers, KRATON® FG1924 and FG1901, do indeed gel within one or two days at the higher AlAcAc concentrations. At the lower AlAcAc concentrations, the viscosity increased initially but then remained constant over the three week period. The lower MW maleated G1726 is very low in viscosity at this solids content and no viscosity increase was measurable even after 3 weeks at the highest AlAcAc concentration.

EXAMPLE 6

A sample comprising 40%w solids solution of the KRATON® FG1924 based PSA in a 75/25 toluene/isopropyl acetate solvent was prepared to determine whether gelation can be inhibited by adding excess 2,4-pentanedione to an adhesive solution The solution with no 2,4-pentanedione added became a soft gel in about three hours after addition of 0.2%w AlAcAc. As shown in Table 10, 0.2%w 2,4-pentanedione added to the solution before 0.2%w AlAcAc delayed gelation about 1 week and 0.5%w 2,4pentanedione prevented gelation for over 2 weeks.

COMPARATIVE EXAMPLE 1

An experiment was planned to compare $Zr(C_5H_8O_2)_4$, $Al(C_5H_8O_2)_3$, $Zn(C_5H_8O_2)_2$, and $Na(C_5H_8O_2)$, (ZnAcAc and NaAcAc are only available as the hydrate) as crosslinkers for a maleated KRATON® G polymer. All four of these acetylacetonate crosslinkers are solids and so it was necessary to dissolve them in a solvent which would also dissolve the polymer, resin and oil. A suitable solvent could not be found for ZnAcAc or NaAcAc so they could not be tested. At 10%w, they were insoluble in tetrahydrofuran, methyl ethyl ketone, acetone, isopropyl acetate, toluene, methanol and blends of toluene with isopropyl acetate or methanol. Results in Table 11 show that ZrAcAc gives some improvement in SAFT. However, comparison of these results with results in Table 4 show ZrAcAc was not nearly as effective as AlAcAc.

TABLE 7

Crosslinking Maleated KRATON G1726 with AlAcAc

| Composition, % w | 1 | 2 | 3 | 4 | 5 |
|---|---|---|---|---|---|
| Run B22, 1726/MA | 30.0 | 30.0 | 30.0 | 30.0 | 30.0 |
| REGALITE R91 | 49.4 | 49.4 | 49.4 | 49.4 | 49.4 |
| DRAKEOL 34 | 20.6 | 20.6 | 20.6 | 20.6 | 20.6 |
| Aluminum acetylacetonate | | 0.1 | 0.2 | 0.5 | 1.0 |
| PSA Solution, Time to Gel, wk | >2 | >2 | >2 | >2 | >2 |
| Properties[a] | | | | | |
| Rolling Ball Tack, cm | 4.3 | 2.8 | 2.2 | 3.6 | 3.6 |
| Polyken Probe Tack, kg | 1.01 | 0.91 | 0.90 | 1.00 | 0.91 |
| Loop Tack, oz/in | 90 | 70 | 74 | 61 | 55 |
| 180° Peel, pli | 2.6 | 2.3 | 2.3 | 2.2 | 2.0 |
| HP to Steel (.5 × .5", 1 kg), min | 630 | 4700 | >9000 | >9000 | >9000 |
| HP to Steel (.5 × 1", 1 kg), min | >9000 | >9000 | >9000 | >9000 | >9000 |
| Gel soaked in Toluene | no | no | Yes | yes | Yes |
| SAFT (1 × 1", .5 kg), °C. | | | | | |
| 0 day | 66 | 66 | 69 | 74 | 75 |
| 1 day | 68 | 69 | 72 | 82 | 87 |
| 5 day | 70 | 71 | 74 | 84 | 89 |
| 1 wk | 70 | 73 | 78 | 88 | 91 |
| 2 wk | 71 | 75 | 82 | 90 | 96 |
| 3 wk | 71 | 75 | 82 | 91 | 97 |

[a]Adhesives cast on Mylar, baked 10 minutes @ 180° C., stored at CTCH.

TABLE 8

Crosslinking of KRATON FG1901 with AlAcAc

| Composition, % w | 1 | 2 | 3 | 4 |
|---|---|---|---|---|
| KRATON FG1901 | 30.0 | 30.0 | 30.0 | 30.0 |
| REGALITE R91 | 49.4 | 49.4 | 49.4 | 49.4 |
| DRAKEOL 34 | 20.6 | 20.6 | 20.6 | 20.6 |
| Aluminum acetylacetonate | | 0.1 | 0.2 | 0.5 |
| PSA Solution, Time to Gel | >2 wk | >1 wk | >1 wk | 4 day |
| Properties[a] | | | | |
| Rolling Ball Tack, cm | 3.7 | 3.1 | 3.3 | 4.1 |
| Polyken Probe Tack, kg | 0.96 | 0.67 | 0.80 | 0.72 |
| Loop Tack, oz/in | 47 | 49 | 47 | 44 |
| 180° Peel, pli | 1.8 | 1.6 | 1.5 | 1.3 |
| HP to Steel (.5 × .5", 2 kg), min | 13 | 52 | 7 | 13 |
| HP to Steel (.5 × .5", 1 kg), min | >4000 | >4000 | >4000 | >4000 |
| Gel soaked in toluene | no | no | yes | Yes |
| SAFT (1 × 1", .5 kg), ° C. | | | | |
| 0 day | 74 | 79 | 92 | 122 |
| 1 day | 73 | 79 | 89 | 114 |
| 4 day | 74 | 76 | 91 | 114 |
| 1 wk | 74 | 80 | 92 | 123 |
| 2 wk | 74 | 80 | 93 | 129 |
| 3 wk | 74 | 80 | 93 | 129 |

[a]Adhesives cast on Mylar, baked 10 minutes @ 180° C., stored at CTCH.

TABLE 9

Viscosity vs Time of Solvent Based PSA's in Tables 6, 7 and 8

With KRATON FG1924 - Formulations in Table 6 dissolved at 40% w in 75/25 toluene/isopropyl acetate.

| Solution Viscosity, cps[a] | 6-1 | 6-2 | 6-3 | 6-4 | 6-5 |
|---|---|---|---|---|---|
| 0 Day | 4650 | 4410 | 4260 | 4240 | 3330 |
| 1 Day | 4670 | 5810 | 7960 | 7980 | 9260 |
| 4 Day | 4650 | 6180 | 8030 | gel | gel |
| 1 Week | 4670 | 7240 | 8150 | gel | gel |
| 2 Week | 4660 | 7220 | 8180 | | |
| 3 Week | 4680 | 7250 | 8210 | | |

With Run B22, 1726/MA - Formulations in Table 7 dissolved at 40% w in 75/25 toluene/isopropyl acetate.

| Solution Viscosity, cps[a] | 7-1 | 7-2 | 7-3 | 7-4 | 7-5 |
|---|---|---|---|---|---|
| 0 Day | <100 | <100 | <100 | <100 | <100 |
| 1 Day | <100 | <100 | <100 | <100 | <100 |
| 4 Day | <100 | <100 | <100 | <100 | <100 |
| 1 Week | <100 | <100 | <100 | <100 | <100 |
| 2 Week | <100 | <100 | <100 | <100 | <100 |
| 3 Week | <100 | <100 | <100 | <100 | <100 |

With KRATON FG1901 - Formulations in Table 8 dissolved at 40% w in 75/25 toluene/isopropyl acetate.

| Solution Viscosity, cps[a] | 8-1 | 8-2 | 8-3 | 8-4 | 8-5 |
|---|---|---|---|---|---|
| 0 Day | 400 | 100 | 100 | 520 | 840 |
| 1 Day | 450 | 780 | 2180 | 8010 | gel |
| 4 Day | 480 | 880 | 2520 | gel | gel |
| 1 Week | 485 | 990 | 2880 | gel | gel |
| 2 Week | 480 | 870 | 2830 | | |
| 3 Week | 485 | 950 | 2880 | | |

[a]Brookfield viscosity @ 25° C. of PSA solution versus time after AlAcAc was added.

TABLE 10

Prevention of Gelation of Solutions of Maleated G and AlAcAc

| Composition % w[a] | 1 | 2 | 3 | 4 | 5 |
|---|---|---|---|---|---|
| KRATON FG1924 | 12.0 | 12.0 | 12.0 | 12.0 | 12.0 |
| REGALREZ 1085 | 21.8 | 21.8 | 21.8 | 21.8 | 21.8 |
| DRAKEOL 34 | 6.2 | 6.2 | 6.2 | 6.2 | 6.2 |
| Aluminum acetylacetonate | 0.2 | 0.2 | 0.2 | 0.2 | 0.2 |
| Toluene | 45.0 | 45.0 | 45.0 | 45.0 | 45.0 |
| Isopropyl acetate | 15.0 | 15.0 | 15.0 | 15.0 | 15.0 |
| 2,4-pentanedione | | 0.2 | 0.5 | 1.0 | 2.0 |
| Time to Gelation | | | | | |
| Soft, slimy gel | 3 hr | 1 wk | >2 wk | >2 wk | >2 wk |

[a]All components were mixed except AlAcAc. After AlAcAc was mixed in, the bottles were left on the bench top at RT. The bottles were tipped periodically to judge whether the solutions had gelled.

EXAMPLE 7

Nine samples shown in Table 12 were prepared to show the effect of crosslinking on the resistance of PSA based on KRATON® FG1924 polymer to dioctyl phthalate (DOP). It is well known that KRATON Rubber based PSA cannot be used on film substrates made of PVC plasticized with a liquid plasticizer such as DOP. The reason is that the DOP migrates from the PVC film into the PSA layer, reducing the glass transition temperature of the polystyrene domains and thereby reducing the cohesive strength of the PSA. Results in Table 12 show that crosslinking KRATON® FG1924 polymer with AlAcAc helps to maintain the integrity of the network even when the polystyrene domains have been plasticized. The SAFT of the uncrosslinked control with no DOP is 71° C. Addition of 10%w DOP dropped the value to 46° C. but crosslinking it with as little as 0.2 %w AlAcAc restored the SAFT to 82° C. Addition of 20%w DOP to the PSA dropped the SAFT to 38° C. but crossliling it with 0.5%w AlAcAc restored the SAFT to 72° C. Crosslinking also restored the failure mechanism in the 180° peel test to adhesive failure, even at up to 20%w DOP in the formulation.

TABLE 11

Crosslinking KRATON FG1924 with ZrAcAc

| Composition, % w | 1 | 2 | 3 | 4 |
|---|---|---|---|---|
| KRATON FG1924 | 30.0 | 30.0 | 30.0 | 30.0 |
| REGALREZ 1085 | 54.4 | 54.4 | 54.4 | 54.4 |
| DRAKEOL 34 | 15.5 | 15.5 | 15.5 | 15.5 |
| Zirconium acetylacetonate | | 0.1 | 0.2 | 0.5 |
| PSA Solution, Time to Gel Properties | — | >1 wk | >1 wk | >1 wk |
| Rolling Ball Tack, cm | 2.1 | 3.1 | 2.3 | 2.3 |
| Polyken Probe Tack, kg | 1.4 | 1.5 | 1.5 | 1.6 |
| Loop Tack, oz/in | 122 | 96 | 101 | 108 |
| 180° Peel, pli | 3.9 | 3.5 | 3.2 | 2.7 |
| HP to Steel (.5 × .5", 2 kg), min | 81 | 620 | 260 | 150 |
| SAFT (1 × 1", .5 kg), ° C. | 71 | 79 | 78 | 74 |

TABLE 12

Effect of Crosslinking KRATON FG1924 on Resistance to DOP

| | pbw | | | | | | | | |
|---|---|---|---|---|---|---|---|---|---|
| | 1 | 2 | 3 | 4 | 5 | 6 | 7 | 8 | 9 |
| Composition | | | | | | | | | |
| KRATON FG1924 | 30.0 | 30.0 | 30.0 | 30.0 | 30.0 | 30.0 | 30.0 | 30.0 | 30.0 |
| REGALREZ 1085 | 54.4 | 54.4 | 54.5 | 54.4 | 54.5 | 54.5 | 54.4 | 54.5 | 54.5 |
| DRAKEOL 34 | 15.5 | 15.5 | 15.5 | 15.5 | 15.5 | 15.5 | 15.5 | 15.5 | 15.5 |
| Dioctyl phthalate | | 11.1 | 25.0 | | 11.1 | 25.0 | | 11.1 | 25.0 |
| Aluminum acetyl-acetonate | | | | 0.2 | 0.2 | 0.2 | 0.5 | 0.5 | 0.5 |
| Properties[a] | | | | | | | | | |
| Rolling Ball Tack, cm | 2.1 | 2.9 | — | 2.3 | 1.4 | 1.1 | 2.6 | 2.7 | 1.5 |
| Polyken Probe Tack, kg | 1.4 | 0.77 | — | 1.2 | 1 | 0.49 | 1.1 | 0.80 | 0.44 |
| Loop Tack, oz/in | 122 | 88 | — | 113 | 47 | 78 c | 93 | 39 | 31 |
| 180° Peel, pli | 3.9 | 3.2 | 0.9 | 2.9 | 1.7 | 2.1 | 2.8 | 1.6 | 1.3 |
| HP to Steel (.5 × .5", 2 kg), min | 81 | 1 c | — | 122 | 7 c | 0 c | 34 | 13 | 2 |
| SAFT (1 × 1", .5 kg), °C. | 71 | 46 | 38 | 107 | 82 | 57 | 72 | 97 | 72 |

[a]) Adhesives cast on Mylar, baked 10 minutes @ 180° C.

EXAMPLE 8

Two examples of PVC films were examined as shown in Table 13. Both were 100 micron thick, white PVC films. One was plasticized with DOP. The other used a non-migrating polyadipate type plasticizer.

TABLE 13

Effect of crosslinking KRATON FG1924 on Resistance to DOP

| Composition, % w | 1 | 2 | 3 | 4 | 5 | 6 |
|---|---|---|---|---|---|---|
| KRATON FG1924 | 30.0 | 35.5 | 35.4 | 30.0 | 35.5 | 35.4 |
| REGALREZ 1085 | 54.5 | 64.5 | 64.3 | 54.5 | 64.5 | 64.3 |
| DRAKEOL 34 | 15.5 | | | 15.5 | | |
| Aluminum acetylacetonate | | | 0.24 | | | 0.24 |
| Substrate[a] | PVC with Polyadipate[b] | | | PVC with DOP[c] | | |
| Properties | | | | | | |
| Polyken Probe Tack, kg | 0.17 | 0.28 | 0.16 | 0.8 | 0.75 | 0.48 |
| Loop Tack, oz/in | 27 | 16 | 20 | 42 | 26 | 42 |
| 180° Peel, pli | 8 | 8 | 6.7[e] | 8 | 5.5 | 7.3 |
| HP to Steel (.5 × .5", 2 kg), min | 254[d] | 116[e] | 70 | 17[d] | 28[e] | 122[e] |
| SAFT (1 × 1", .5 kg), °C. | 89 | 67 | 71 | 84 | 74 | 84 |
| PVC Shrinkage @ 60° C. | no | no | no | slight | slight | no |

[a]Adhesives cast directly on the substrate, solvent was flashed and films were baked 10 min @ 80° C.
[b]4 mil, white, PVC plasticized with polyadipate.
[c]4 mil, white, PVC plasticized with DOP.
[d]Failure mechanism was cohesive.
[e]PVC stretched and tore.

Table 13 shows the effect of crosslinking KRATON® FG1924 polymer on resistance to DOP. The formulations in Table 13 were coated directly onto the PVC films at a dry adhesive film thickness of about 40 microns. Solvent was flashed in the hood for 1 hour and the films were baked 10 minutes at 80° C. The baked films were stored overnight at 25° C. Release paper was then laminated to the PSA. Pieces 75×75 millimeters were cut from the laminates, the release paper was removed and the films were adhered to clean glass plates. The plates and the remainder of the laminates were stored for 1 week at 60° C. to allow migration of the plasticizer. The samples were again stored overnight at 25° C. before testing. The squares on the glass plates were examined for shrinkage and the properties shown in Table 13 were measured.

Results show that, on the PVC plasticized with the non-migrating polyadipate plasticizer, there was no evidence of shrinkage of the films adhered to the glass plates. This demonstrates the well known fact that conventional KRATON® Rubber PSA work well on PVC plasticized with a non-migrating plasticizer. On the PVC plasticized with DOP, both PSA without AlAcAc allowed the PVC to shrink, leaving a sticky deposit all around the edges of the film. Curing the PSA with AlAcAc prevented the shrinkage of the PVC film.

EXAMPLE 9

Four samples of 30%w of KRATON® FG1901 polymer, 52.2%w REGALREX 1085, and 17.8%w DRAKEOL 34 were mixed as hot melts in a sigma blade mixer at 175° C. After mixing for about 1 hour, a homogeneous blend was obtained. AlAcAc was then added to the hot melt adhesives in the concentrations shown in Table 14 and mixing was continued for about 30 minutes at 175° C. The hot melt PSA were coated onto 25 micron thick Mylar with a heated doctor blade. After coating, the adhesives were stored at room temperature for 3 days prior to testing. Results in Table 14 show a significant increase in SAFT. This example shows that the reactive adhesives can be processed as hot melts and that the PSA were indeed crosslinked.

EXAMPLE 10

The formulations shown in Table 14 were mixed in a sigma blade mixer but, in this experiment, mixing was continued for 3 hours or until the adhesives gelled. The formulations containing 30%w KRATON® FG1901 polymer and up to 1.0%w AlAcAc were mixed for up to 3 hours at 175° C. without gelation. However, when KRATON® FG1924 polymer was used instead of KRATON® FG1901 polymer, the formulation containing 0.2%w AlAcAc was mixed for 3 hours but the formulation containing 0.5%, AlAcAc gelled about 30 minutes after the AlAcAc was added. It was observed that adhesives containing AlAcAc darkened substantially more than the adhesive without AlAcAc when held at high temperature.

TABLE 14

Crosslinking of HPMSA based on KRATON FG1901 with AlAcAc

| Composition, % w | 1 | 2 | 3 | 4 |
|---|---|---|---|---|
| KRATON FG1901 | 30.0 | 30.0 | 30.0 | 30.0 |
| REGALREZ 1085 | 52.2 | 52.2 | 52.2 | 52.2 |
| DRAKEOL 34 | 17.8 | 17.8 | 17.8 | 17.8 |
| Aluminum acetylacetonate | | 0.2 | 0.5 | 1.0 |
| Properties[a] | | | | |
| Thickness, mil | 7.5 | 8.0 | 6.8 | 10.5 |
| Rolling Ball Tack, cm | 2.6 | 2.7 | 2 | 2.3 |
| Polyken Probe Tack, kg | 1 | 1.1 | 1.3 | 1.2 |
| Loop Tack, oz/in | 147 | 113 | 104 | 160 |
| 180° Peel, pli | 5 | 4.8 | 5 | 5.3 |
| HP to Steel (.5 × .5", 1 kg), min | 40 | 15 | 25 | 30 |
| SAFT (1 × 1", .5 kg), ° C. | 74 | 87 | 85 | 94 |
| Gel soaked in Toluene | none | none | nice | v nice |

[a]Adhesives were mixed in sigma blade under $N_2$. AlAcAc was added and mixing was continued for 30 min at 175° C. HMPSA was immediately coated onto 1 mil Mylar with heated doctor blade. Films were stored 3 days at CTCH before testing

EXAMPLE 11

Seven oil gel samples were prepared by mixing KRATON® FG1901 polymer and IRGANOX 1010 into DRAKEOL 34 at the concentrations shown in Table 15 with a Silverson mixer at 165° C. After mixing for about 1 hour, a homogeneous blend was obtained. AlAcAc powder was then added to the hot blends in concentrations of 0.2%w, 0.5%w or 1.0%w, and mixing was continued for 10 minutes at 165° C. The blends were poured into Ring and Ball Softening Point rings and into a release paper mold to give a sheet of the compound about 20–30 mm. thick These samples were stored at room temperature for various periods before testing.

TABLE 15

R&B Softening Point vs Aging Time for Crosslinked Oil Gels

| | % w | | | | | | |
|---|---|---|---|---|---|---|---|
| | 1 | 2 | 3 | 4 | 5 | 6 | 7 |
| Composition | | | | | | | |
| DRAKEOL 34 | 90 | 90 | 90 | 80 | 80 | 80 | 80 |
| KRATON FG1901 | 10 | 10 | 10 | 20 | 20 | 20 | 20 |
| IRGANOX 1010 | 0.1 | 0.1 | 0.1 | 0.1 | 0.1 | 0.1 | 0.1 |
| Aluminum Acetylacetonate | | 0.2 | 0.5 | | 0.2 | 0.5 | 1 |
| R&B Softening Point, ° C., after aging at RT for: | | | | | | | |
| Initial | 67[a] | 81[a] | 83[a] | 81[a] | 96[a] | 97[a] | 100[b] |
| 5 day | | 109[b] | 112[b] | | 114[a] | >175[b] | >175[b] |
| 11 day | | 127[b] | 162[b] | | 116[b] | >175[c] | >175[c] |
| 18 day | | 131[b] | 170[b] | | 125[b] | >175[c] | >175[c] |

[a]. When swollen in toluene, polymer merely dissolved (no gel).
[b]. Gel swollen in toluene was crumbly.
[c]. Gel swollen in toluene had nice integrity & maintained its shape.

Softening Point (SP) according to ASTM D-36 was measured as a function of storage time for up to 3 weeks after the rings were filled. At the same time each SP was measured, a 20×20×40 millimeter piece from the sheet of the oil gel was also soaked in toluene to get an idea of the structure of the crosslinked polymer gel which had formed.

Results in Table 15 show that the maleated polymer in the oil gels is indeed crosslinked by addition of AlAcAc and that the extent of crosslinking increases with time. For the oil gels containing 10%w polymer, SP shows an initial increase of about 15° C. above the uncrosslinked control and then continues to increase over about a 3 week period. Pieces of the oil gels, which contained no AlAcAc, merely dissolved when soaked in toluene. For the gels containing 20%w polymer, as little as 0.2%w AlAcAc was sufficient to give a substantial increase in SP. In the samples containing 0.5 or 1.0%w AlAcAc, after the samples had cured for only 5 days at ambient temperature, the SP was above 175° C. After a 3 week cure period, the samples had an impressive gel structure in that the gels swelled to over twice their initial dimensions but they maintained the original shape of the piece of oil gel when immersed in toluene.

EXAMPLE 12

Five asphalt samples were prepared by mixing KRATON® FG1901 polymer and Shell Wood River AC-5 which is a straight-run, unblown asphalt known to have good compatibility with KRATON® Polymers with a Silverson mixer at 175° C. After mixing for about 1 hour, a homogeneous blend was obtained. AlAcAc powder was then added to the hot blends in concentrations of 0.2%w, 0.5%w or 1.0%w, and mixing was continued for 10 min at 175° C. The blends were poured into Ring and Ball Softening Point rings and into a release paper molds. These samples were stored at room temperature for various periods before testing.

Results in Table 16 show that the behavior in modified asphalt was similar to the behavior in oil gels. Addition of 15%w KRATON® FG1901 raised the SP of the asphalt from 57° C. to 90° C. and reduced the penetration measured by ASTM D-5 from 128 to 33. Addition of 0.2%w AlAcAc gave a significant increase in SP but addition of 0.5 or 1.0%w AlAcAc gave very impressive increases in SP. After a 3 week cure at ambient temperature, there was no flow of the modified asphalt in the ring under the weight of the ball at temperatures up to 175° C.

EXAMPLE 13

Samples 3 and 4 in Table 15 were mixed with a Silverson mixer at 160° C. for 3 hours after the addition of AlAcAc to check whether the oil gels might gel during mixing at high temperature after addition of AlAcAc. There was no obvious increase in viscosity during mixing and the samples poured readily from the beaker at 160° C. after the 3 hour mixing period. It was observed that Sample 3 darkened over the 3 hour period at 160° C. although there was no noticeable increase in viscosity. There was no color change in Sample 4 and also no noticeable increase in viscosity. This example shows that the working life of the reactive oil gel is at least 3 hours at 160° C. It also shows, however, that for applications requiring light color, precautions will be necessary to minimize the color caused by AlAcAc.

TABLE 16

R&B Softening Point vs Aging Time for Asphalt/1901/AlAcAc

| Composition, % w | 1 | 2 | 3 | 4 | 5 |
|---|---|---|---|---|---|
| Wood River AC-5 Asphalt | 100 | 85 | 85 | 85 | 85 |
| KRATON FG1901 | | 15 | 15 | 15 | 15 |
| Aluminum Acetylacetonate | | | 0.2 | 0.5 | 1 |
| Penetration | 128 | 33 | 33 | 33 | 30 |

TABLE 16-continued

R&B Softening Point vs Aging Time for Asphalt/1901/AlAcAc

| Composition, % w | 1 | 2 | 3 | 4 | 5 |
|---|---|---|---|---|---|
| R&B Softening Point, ° C., After aging at RT for | | | | | |
| Initial | 57 | 90[a] | 93[a] | 96[a] | 98[a] |
| 1 week | | 91[a] | 96[a] | 109[a] | 126[a] |
| 2 week | | 92[a] | 98[a] | 147[b] | >175[b] |
| 3 week | | 92[a] | 114[a] | >175[b] | >175[b] |

[a]When swollen in toluene, polymer merely dissolved (no gel).
[b]Gel swollen in toluene was slimy.

EXAMPLE 14

Blends of KRATON® Polymers with either microcrystalline wax or a combination of wax and tackifying resin are used in a wide variety of applications such as non-PSA hot melt adhesives (HMA) and barrier coatings. The formulations in Table 17 were prepared and tested to determine whether crosslinking the polymer in the blend would improve the high temperature properties of the HMA or coating. Formulations 1, 2 and 3 are based on blends of the acid functional polymer and a microcrystalline wax. Formulations 4, 5 and 6 are based on blends of the acid functional polymer and a combination of a paraffin wax and a tackifying resin. The blends were made by heating the wax or the wax and resin along with the antioxidant to 165° C. and the KRATON® FG1901 polymer was mixed into the blend with a Silverson mixer for 1.5 hour at 165° C. AlAcAc was then added to the blend and mixing was continued for 10 minutes. The hot blends were poured into softening point rings and enough of the hot blend was poured into a release paper mold to give a sheet of the compound about 10 mm thick These samples were stored at room temperature until they were tested. Softening point was measured after 1, 6, 14 and 21 days at room temperature. After 21 days, a 30×30 mm piece was cut from the 10 mm thick sheet and placed in an oven at 100° C. for 1 hour to determine slump resistance. The results are shown in Table 17.

Blends 1 and 4, demonstrating the behavior of conventional uncrosslinked compositions, began to melt and flow at about 90° C. Blends 1 and 4 also slumped severely in the oven at 100° C. Blends 2, 3, 5 and 6, which all contained AlAcAc, crosslinked, exhibiting softening points greater than about 160° C. The 30×30×10 mm pieces of blends 2, 3, 5 and 6 survived 1 hour in the oven at 100° C. with no slump or flow

EXAMPLE 15

Since sealants based on KRATON® Polymers are thermoplastic, formulating sealants having adequate performance at elevated temperatures has always been a challenge. At temperatures of 70 to 90° C., conventional sealants based on KRATON® Polymers will soften and flow out of a vertical joint. Example 15 was performed to determine whether this problem could be prevented by using an acid functional KRATON® Polymer in the sealant and crosslinking it with AlAcAc. Referring to Table 18, two basic formulations were tested, one containing 20%w polymer (Formulations 1 and 2), and one containing 30%w polymer (Formulations 3 and 4). The relative amounts of endblock resin, midblock resin, and midblock plasticizer were adjusted to give the Formulations a Shore A hardness of about 30 to 40 and to give a midblock phase Tg calculated to be about −30° C. Formulations 1 and 3 were uncrosslinked conventional sealants. Formulations 2 and 4 were crosslinked with AlAcAc. The hot melts without AlAcAc were mixed in a sigma blade mixer at 175° C. After mixing for about 1 hour, a homogeneous blend was obtained. AlAcAc was then added and mixing continued for 30 minutes at 175° C. The hot sealants from the mixer were poured into steel channels of the type specified for measuring slump of non-sag type sealants in ASTM C639-95. The filled channels were stored at room temperature for 3 weeks before testing. The channels were then placed vertically in an oven and the slump was noted after 1 hour in the oven at 70, 100 or 130° C.

Results in Table 18 show the addition of AlAcAc to sealants based on an acid functional KRATON® Polymer to be surprisingly effective in improving slump resistance at elevated temperatures. All four sealants had a Shore A hardness near the desired range. The sealants crosslinked with AlAcAc showed a somewhat higher hardness than the uncrosslinked sealants. The slump resistance of Formulation 1 was marginal at 70° C. and was a complete failure at 100 and 130° C. Formulation 2, containing AlAcAc, was substantially better than formulation 1. Formulation 2 showed no slump at 70° C. and was much better than Formulation 1 at 100 and 130° C. Formulation 3 showed no slump at 70° C. but was very poor at 100 and 130° C. Formulation 4, also containing AlAcAc, was much better than formulation 3. Formulation. 4 showed no slump at 70 and 100° C. and almost no slump at 130° C.

The sealants in Table 18 may also be handled as solvent based products, at about 70%w solids in a solvent such as toluene. The sealants may be used as a two-component, solvent based system in which the AlAcAc is mixed into the sealant immediately before the sealant is applied to a substrate. Additionally, the sealants may be used as a one-component system in which the AlAcAc is present in the sealant and excess of 2,4-pentanedione is added to prevent gelation of the sealant while the sealant is stored before use.

While foregoing is directed to the preferred embodiment of the present invention, other and further embodiments of the invention may be devised without departing from the basic scope thereof, and the scope thereof is determined by the claims that follow.

TABLE 17

R&B Softening Point vs Aging Time for Crosslinked Wax Blends

| Composition, % w | 1 | 2 | 3 | 4 | 5 | 6 |
|---|---|---|---|---|---|---|
| SHELLMAX 400 | 85 | 85 | 85 | | | |
| SHELLWAX 200 | | | | 70 | 70 | 70 |
| REGALITE R-101 | | | | 15 | 15 | 15 |
| KRATON FG1901 | 15 | 15 | 15 | 15 | 15 | 15 |
| IRGANOX 1010 | 0.1 | 0.1 | 0.1 | 0.1 | 0.1 | 0.1 |

TABLE 17-continued

R&B Softening Point vs Aging Time for Crosslinked Wax Blends

| Composition, % w | 1 | 2 | 3 | 4 | 5 | 6 |
|---|---|---|---|---|---|---|
| Aluminum Acetylacetonate |  | 0.5 | 1 |  | 0.5 | 1 |
| Melt Vis @ 121° C., Pa.s | 11.5 |  |  | 0.82 |  |  |
| R&B Softening Point, ° C., after curing at RT for |  |  |  |  |  |  |
| 1 day | 88 | 99 | 111 | 87 | 102 | 106 |
| 6 day | 89 | 134 | >160 | 87 | >160 | >160 |
| 14 day | 92 | >160 | >160 | 88 | >160 | >160 |
| 21 day | 92 | >160 | >160 | 90 | >160 | >160 |
| Slump @ 100° C. after curing for 3 weeks cure @ RT | severe | none | none | severe | none | none |

TABLE 18

Preventing Slump of Sealants by Crosslinking with AlAcAc

| Formulation, % w | 1 | 2 | 3 | 4 |
|---|---|---|---|---|
| KRATON FG1901 | 20 | 20 | 30 | 30 |
| PICCO 6100 | 30 | 30 | 25 | 25 |
| PICCOTAC 95 | 25 | 25 | 25 | 25 |
| SHELLFLEX 371 | 25 | 25 | 20 | 20 |
| IRGANOX 1010 | 0.1 | 0.1 | 0.1 | 0.1 |
| Aluminum Acetylacetonate |  | 1 |  | 1 |
| Melt Vis @ 177° C., Pa.s | 1.3 |  | 6.1 |  |
| Shore A Hardness after 3 weeks @ RT | 28 | 34 | 31 | 41 |
| Channel Slump after 3 weeks @ RT |  |  |  |  |
| at 70° C. | 10 mm slump | none | none | none |
| at 100° C. | melted | 10 mm slump | 50 mm slump | none |
| at 130° C. | melted | 14 mm slump | melted | 5 mm slump |

TABLE 19

Identification of Ingredients

| Ingredient | Supplier | Structure |
|---|---|---|
| KRATON G1652 | KRATON Polymers | S-EB-S polymer, 30% w Styrene |
| KRATON G1657 | KRATON Polymers | S-EB-S polymer, 13% w Styrene |
| KRATON FG1901 | KRATON Polymers | S-EB-S polymer, 30% w Styrene, 1.5% w MA |
| KRATON FG1924 | KRATON Polymers | S-EB-S polymer, 13% w Styrene, 1.0% w MA |
| KRATON GRP6627 | KRATON Polymers | S-EB-S polymer, 13% w Styrene, 2.0% w MA |
| REGALREZ 1085 | Hercules | Hydrogenated hydrocarbon resin, 85° C. S.P. |
| REGALITE R91 | Hercules | Hydrogenated hydrocarbon resin, 90° C. S.P. |
| REGALITE R101 | Hercules | Hydrogenated hydrocarbon resin, 100° C. S.P. |
| PICCOTAC 95 | Hercules | Aliphatic hydrocarbon resin, 95° C. S.P. |
| PICCO 6100 | Hercules | Aromatic hydrocarbon resin, 100° C. S.P. |
| DRAKEOL 34 | Penreco | Aromatic-free, paraffinic/naphthenic process oil |
| SHELLFLEX 371 | Shell Oil | Naphthenic process oil, 2% aromatics |
| SHELLWAX 200 | Shell Chemical | Paraffin wax, 60° C. M.P. |
| SHELLMAX 400 | Shell Chemical | Microcrystalline wax, 80° C. M.P. |
| IRGANOX 1010 | Ciba Geigy | Phenolic antioxidant |

What is claimed is:

1. A polymer composition, comprising a functionalized, hydrogenated block copolymer crosslinked with aluminum acetylacetonate.

2. The polymer composition of claim 1, wherein the functionalized, hydrogenated block copolymer comprises an ABA block structure having polystyrene endblocks.

3. The polymer composition of claim 2, wherein the polystyrene endblocks comprise 5–60 percent by weight of the copolymer.

4. The polymer composition of claim 2, wherein the polystyrene endblocks comprise 5–30 percent by weight of the copolymer.

5. The polymer composition of claim 2, wherein each polystyrene endblock has a number average molecular weight of about 2,000 to 115,000.

6. The polymer composition of claim 2, wherein each polystyrene endblock has an average molecular weight of between about 4,000 and 60,000.

7. The polymer composition of claim 1, wherein the block copolymer has a polymerized conjugated diene midblock having a number average molecular weight of about 20,000 to about 450,000.

8. The polymer composition of claim 7, wherein the conjugated diene is 1,3-butadiene.

9. The polymer composition of claim 1, wherein the block copolymer has been hydrogenated and grafted with maleic anhydride.

10. The polymer composition of claim 9, wherein substantially all of the maleic anhydride is grafted at secondary or tertiary carbon positions.

11. The polymer composition of claim 1, wherein aluminum acetylacetonate is present in a concentration from about 0.2 percent by weight to about 10 percent by weight of the block copolymer.

12. An adhesive, sealant, oil gel, asphalt composition, or wax composition comprising the polymer composition of claim 1.

* * * * *